Patented Aug. 17, 1948

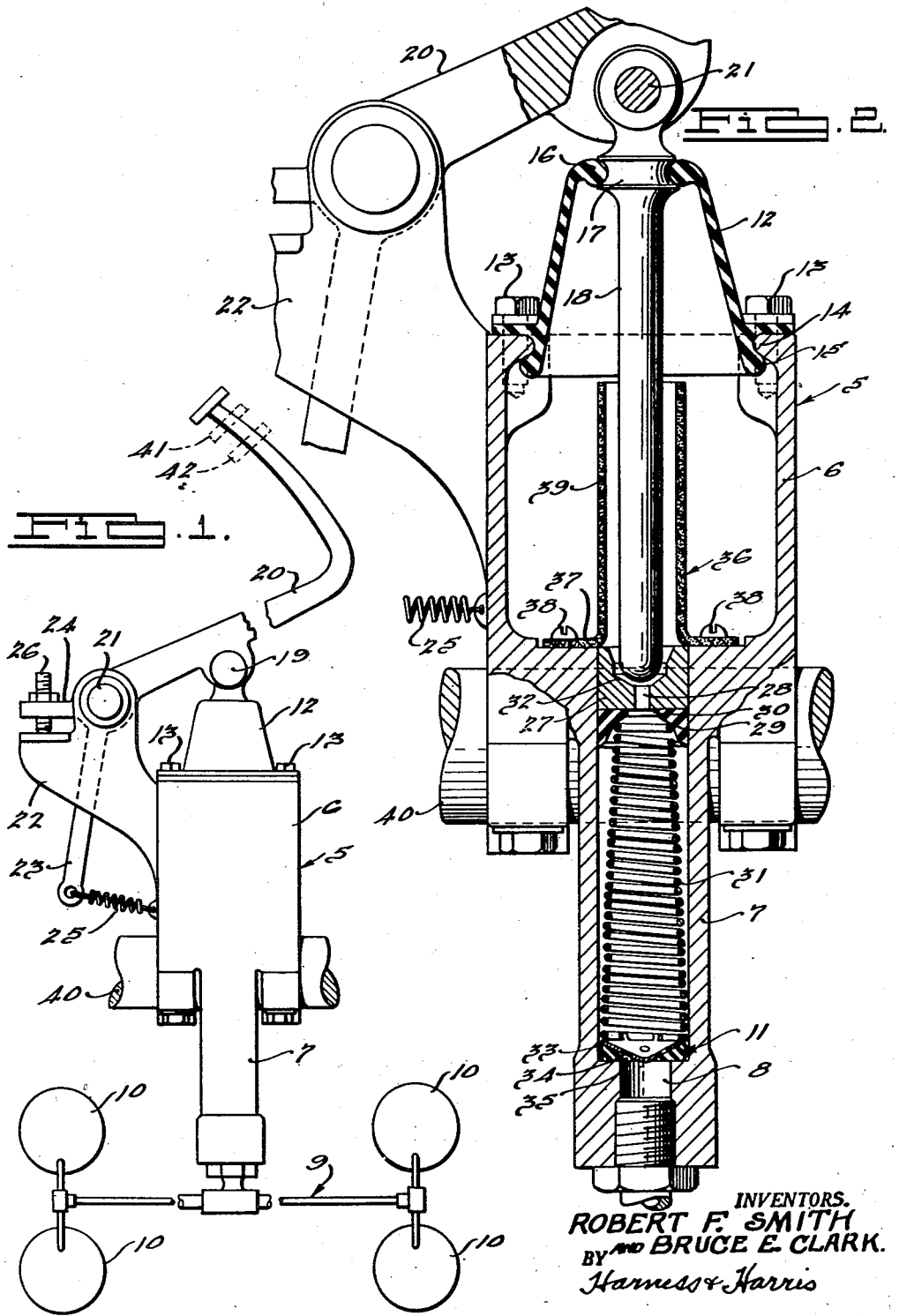

2,447,142

UNITED STATES PATENT OFFICE 2,447,142

MASTER CYLINDER

Robert F. Smith and Bruce E. Clark, Detroit, Mich., assignors to Chrysler Corporation, Highland Park, Mich., a corporation of Delaware Application December 29, 1944, Serial No. 570,298

2 Claims. (Cl. 60—54.6)

This invention relates to hydraulic brake mechanism and more particularly to improvements in the master cylinder and the fluid reservoir.

Hydraulic brake systems of the type commonly employed in motor vehicles include a fluid reservoir, a master cylinder, and individual wheel cylinders. A piston operates in the master cylinder to discharge fluid therefrom under pressure to the wheel cylinders for actuation of the wheel brakes. A resiliently, non-metallic seal moving with the piston is urged radially outwardly into sealing engagement with the cylinder wall to prevent unintended flow of fluid by the piston during the pressure stroke thereof.

Where communication between the fluid reservoir and master cylinder is had through an aperture or a port opening into the cylinder in advance of the piston and seal, considerable difficulty has been experienced with undue seal wear and early failure. The seal is forced radially outwardly and tends to enter the aperture or port as it is moved thereby with the result that the sealing periphery soon wears or is so torn as to lose its effectiveness.

An object of the invention is the elimination of the aforesaid seal failure by the provision of a cylinder which is free from apertures, ports or the like at that portion thereof engaged by the seal during piston movement.

Furthermore, where ports or the like open into the cylinder in advance of the piston and seal there is an interim between piston movement and intended brake application necessitated by movement of the seal and piston to close such ports; and an object of the invention is the elimination of the cause of the aforesaid interim and thus shorten the effective stroke of the piston and the actuating means therefor.

In carrying out the foregoing objects the pressure piston has an aperture therethrough opening at one end to the fluid reservoir and at the other end, through an apertured seal, to the master cylinder, providing a passage for the flow of fluid from the reservoir to the cylinder and return. An actuator for moving the piston on its pressure-creating stroke engages the piston and closes the passage to the flow of fluid therethrough during actuation of the piston thereby, thus serving a dual function. The actuator is so disposed when the piston is in idle position as to permit flow of fluid through the passage.

A further object of the invention is the provision of a fluid filter in the reservoir so positioned as to function as a stop for limiting movement of the piston on its return or retractile stroke.

Other objects and advantages of the invention will be more apparent from the following description taken in connection with the accompanying drawings, wherein:

Fig. 1 is a view somewhat schematic of a hydraulic brake system embodying the invention.

Fig. 2 is an enlarged sectional view through the master cylinder and reservoir.

The invention is illustrated in a hydraulic brake system of the type applicable to motor vehicles although in its broad aspects the invention is not so limited. In the illustrated embodiment a casing structure, generally indicated by the numeral 5, provides a fluid reservoir 6 above a vertically disposed master cylinder 7 having an opening 8 at the lower end thereof communicating with a tubing, generally indicated by the numeral 9, which in turn is in fluid communication with wheel brake cylinders 10, fluid communicated to the latter under pressure operating the wheel brakes (not shown) in the well known manner. Flow of fluid through the opening 8 is under control of a valve mechanism, generally indicated by the numeral 11, which is the subject matter of application Serial No. 570,299, filed in the name of Robert F. Smith.

The open upper end of the casing 5 is closed by a resiliently yieldable boot 12 of rubber or the like having a flange overlapping the top edge of the casing and secured thereto by fasteners 12. The opening of the casing is bounded by an inwardly extending rib 14 received in a groove between the securing flange and a terminal bead 15. The foregoing construction provides a seal for excluding foreign matter from the reservoir 6. The boot at the top thereof has a central opening bounded by an annular bead 16 engaged in an annular groove 17 in a rod 18 extending through the central opening into the reservoir 6. The rod 18 is adapted to be reciprocated vertically for effecting brake operation, as will hereinafter appear, and for this purpose has the upper end portion thereof pivotally connected as at 19 to an operating pedal 20. This pedal is pivoted at 21 to a support 22 carried by the casing 5 and has a relatively long arm 23 and a relatively short arm 24. A spring 25 connected to the pedal arm 23 and casing 5 yieldably resists movement of the pedal 20 clockwise as viewed in Fig. 1 and urges the pedal to its Fig. 2 position, which position is adjustably established by means of a pin 26 threaded into an opening in the pedal arm 24 and having an end thereof abutting the support 22.

A piston 27 is movable in the master cylinder 7 to discharge fluid therefrom under pressure, the piston having a central, axially extending aperture 28 opening at the upper end to the reservoir 6 and at the lower end to the cylinder 7 through a central aperture 29 in a sealing cup 30 movable with the piston. The passage formed by the apertures 28, 29 constitutes the sole means by which fluid is communicated between the reservoir 6 and cylinder 7. A coil spring 31 urges the valve mechanism 11 toward the seat therefor and the piston to its illustrated position and also urges the cup 30 radially outwardly into sealing engagement with the cylinder wall.

The upper end of the piston is recessed and has a base wall portion extending outwardly and upwardly from the upper end of the aperture 28, which wall portion constituting a portion of a cone and forms an annular valve seat 32. The rod 18 actuates the piston 27 on its pressure stroke and has a spherical valve-forming end portion which extends into the piston recess and is aligned with the valve seat 32. When the piston is in its retracted position, as illustrated in Fig. 2, the spherical end portion of the rod 18 is spaced from the valve seat 32 to permit flow of fluid between the reservoir 6 and the master cylinder 7 through the passage provided by the apertures 28, 30. Upon movement of the rod downwardly for actuation of the piston on its pressure stroke, the spherical end portion engages the valve seat in sealing relation to thereby prevent flow of fluid through the passage in the piston and seal during movement of the piston on its pressure stroke.

The valve mechanism 11 includes a metallic member 33 having a plurality of openings 34 and a centrally apertured rubber member 35 having a lip adapted to be deflected out of sealing engagement with the member 33 by fluid admitted thereto through the openings 34. When the lip is so deflected incident to movement of the piston 27, fluid under pressure will pass from the cylinder 7 through the opening 8 to the tubing 9 and thence to the cylinders 10.

A filter 36, herein illustrated as a porous metallic structure which may be formed by sintering powdered metallic particles, is positioned in the reservoir 6 and includes a base 37 seated on and secured by screws 38 to the casing 5 and a vertically disposed, open-ended cylindrical portion 39 integral with the base 37. The portion 39 has a diameter large enough to receive the rod 18 and a porosity sufficient to permit fluid to flow therethrough to the cylinder 7 while screening therefrom particles of dust, dirt, and other foreign matter which may gain entrance to the reservoir 6. In addition, the filter serves to limit upward movement of the piston 27, as illustrated in Fig. 2.

The casing 5 can be supported in any suitable manner and, as herein illustrated, is detachably secured to a support 40.

For operation of the wheel brakes the pedal 20 is rotated in a clockwise direction, as viewed in Fig. 1, against resistance of the spring 25 thereby moving the rod 18 downwardly and engaging the spherical end portion thereof with the seat 32 to close the passage formed by the apertures 28, 30 to the flow of fluid. With the passage thus closed further movement of the pedal causes the rod 18 to move the piston 27 downwardly producing fluid pressure in the cylinder 7 and opening the valve means 11. Fluid is then discharged through the opening 8 to the tubing 9 and thence to the wheel cylinders, the initial pressure acting to move the brake shoes to take up the clearance normally provided between the latter and the drums respectively associated therewith. Inasmuch as these shoes and drums are well known in the art, they have been omitted here in the interest of brevity. Subsequent movement of the pedal, rod, and piston creates pressure for urging the shoes against the drums and thus retarding vehicle movement. In moving the rod 18 from its Fig. 2 position to engage the piston and seal the passage therethrough as aforesaid, the pedal 20 is moved from its full-line position to the dotted-line position at 41, this pedal travel being commonly termed "free play," and in taking up the aforesaid clearance between the brake shoes and drums the pedal is moved to the dotted line position at 42. The foregoing increment of movement may vary, of course, but nevertheless is illustrative of the two stages of pedal movement preparatory to effecting braking action.

When the pedal is relieved from the moving force, it and the rod 18 will be returned to illustrated positions by the spring 25, and the piston 27 and cup 29 will be returned to their illustrated positions by the spring 31. Upon release of the pressure the valve mechanism will immediately close and trap fluid in the lines 9 and cylinders 10. However, the spring 31 exerts a downward pressure against the valve mechanism 11 sufficient to maintain a residual pressure of a predetermined value therebelow and hence the valve will be unseated when the pressure so trapped exceeds the predetermined value and fluid will be returned through the opening 8 around the valve mechanism 11 to the cylinder 7. Any air returning to the cylinder from the lines 9 will pass upwardly through the piston passage to the reservoir 6.

The master cylinder 7 has no port in advance of and over which the seal 29 is moved and hence the cylinder-engaging periphery of the seal is not subjected to that wear which has occurred in prior structures due to the presence of a port over which the seal is moved. Furthermore, the absence of such a port results in shortened travel of the pedal, rod, and piston to effect brake operation due to the fact that the presence of the port necessitated movement of the seal to close the same and thus a three-stage pedal movement was required in contrast to the two-stage movement herein.

Engagement of the valve-forming spherical end of the rod 18 with the valve seat 32 of the piston 28 forms a highly satisfactory seal. Experience shows that even though the contour of the surface at 32 is engageable by the rod end and may initially vary with respect to the contour of the latter, no difficulty will be experienced thereby as the rod end will shape a perfect seat by its hammer-like blow against the surface at 32. Initially, the rod end may engage a limited portion of the seat surface immediately adjacent the open end of the aperture 28, but the extent of the contacting surface will be increased as the rod perfects its seal.

By recessing the upper end of the piston 28, the end of the rod 18 is brought nearer than would otherwise be possible to the forward face of the piston, and thus the tendency of the piston to cock in the cylinder, should the spring 31 so shift as to exert a cocking force thereagainst, is minimized.

Although but one specific embodiment of the invention is herein shown and described, it will be understood that various changes in the size, shape and arrangement of parts may be made without departing from the spirit of the invention.

We claim:

1. A hydraulic brake system including a fluid reservoir and a vertically disposed master cylinder open at one end to receive fluid from the reservoir by gravity flow, a piston in the cylinder movable downwardly to place the fluid in the cylinder under pressure and upwardly to relieve the pressure, a seal movable with the piston engaged with the cylinder wall, said piston and seal each having an opening cooperating to form a passage for the flow of fluid from the reservoir to the cylinder and return, an actuator movable to move the piston downwardly, the piston having a seat and the actuator having a valve-forming portion engaged with the seat to thereby close said passage to the flow of fluid therethrough during downward movement of the piston, said actuator being further movable to a position to displace said valve-forming portion from said seat and to accommodate upward movement of the piston, and a filter in the reservoir positioned adjacent said one end of the master cylinder for filtering gravity flow of fluid from the reservoir to said piston opening, and constituting a stop to limit said upward movement of the piston to thereby relatively space said piston seat and said actuator valve-forming portion when the actuator is moved to its said position.

2. A hydraulic brake system including a fluid reservoir having a wall and a cylinder open at one end thereof to the reservoir through said wall, a filter surrounding said cylinder open end secured to said bottom wall and projecting outwardly from the latter, a piston reciprocal in said cylinder to place fluid therein under pressure and to relieve such pressure, a portion of said filter overlying said cylinder open end and constituting a stop to limit pressure relieving movement of the piston.

ROBERT F. SMITH.
BRUCE E. CLARK.

REFERENCES CITED

The following references are of record in the file of this patent:

UNITED STATES PATENTS

| Number | Name | Date |
|---|---|---|
| 2,020,465 | Hall | Nov. 12, 1935 |
| 2,038,898 | Goodyear | Apr. 28, 1936 |
| 2,060,846 | Bowen | Nov. 17, 1936 |
| 2,152,499 | Rasmussen | Mar. 28, 1939 |
| 2,181,754 | White | Nov. 28, 1939 |
| 2,373,745 | Conway | Apr. 17, 1945 |

FOREIGN PATENTS

| Number | Country | Date |
|---|---|---|
| 427,829 | Great Britain | May 1, 1935 |